US006442587B1

(12) United States Patent
Yoshida (10) Patent No.: US 6,442,587 B1
(45) Date of Patent: *Aug. 27, 2002

(54) CLIENT/SERVER SYSTEM WHICH AUTOMATICALLY ENSURES THE CORRECT AND EXCLUSIVE SUPERVISION OF DATA AGAINST FAULTS

(75) Inventor: Takashi Yoshida, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/441,024

(22) Filed: May 15, 1995

(30) Foreign Application Priority Data

Jul. 5, 1994 (JP) .............................. 6-153489

(51) Int. Cl.[7] ................................ G06F 9/44
(52) U.S. Cl. ......................... 709/203; 714/38
(58) Field of Search ........................ 395/200.08, 680, 395/684, 200.11, 200.15, 200.06, 182.02, 200.01, 182.18, 182.08, 618, 200.3, 200.33, 200.35, 200.38, 200.54, 183.14, 181; 370/237, 355, 356; 340/827; 709/203

(56) References Cited

U.S. PATENT DOCUMENTS

| | | | | |
|---|---|---|---|---|
| 4,800,488 A | * | 1/1989 | Agrawal et al. | 395/200.55 |
| 5,140,689 A | * | 8/1992 | Kobayashi | 395/182.18 |
| 5,157,663 A | * | 10/1992 | Major et al. | 395/182.08 |
| 5,220,674 A | * | 6/1993 | Morgan et al. | 395/200.01 |
| 5,333,314 A | * | 7/1994 | Masai et al. | 395/618 |
| 5,341,477 A | * | 8/1994 | Pitkin et al. | 395/200.56 |
| 5,396,613 A | * | 3/1995 | Hollaar | 395/575 |
| 5,434,994 A | * | 7/1995 | Shaheen et al. | 707/201 |
| 5,437,031 A | * | 7/1995 | Kitami et al. | 395/650 |
| 5,553,083 A | * | 9/1996 | Miller et al. | 371/32 |
| 5,566,297 A | * | 10/1996 | Devarakonda et al. | 395/182.13 |
| 5,588,148 A | * | 12/1996 | Landis et al. | 395/601 |
| 5,652,908 A | * | 7/1997 | Douglas et al. | 395/800 |

OTHER PUBLICATIONS

Welch, Brent Ballinger, "Naming, State Management, and User–Level Extensions inthe Sprite Distributed File System", Chapter 6, pp. 82–99, 1990.*

Danzig et al., "An Analysis of Wide–Area Name Server Traffic", ACM, pp. 281–292, 1992.*

Genosa, William, "Monitoring Performance with iostat and vmstat", System Administrator, pp. (9), Mar. 1994.*

Baker., "Availability in the Sprite Distributed File System," Operating Systems Review, pp. (4), Apr. 1991.*

* cited by examiner

*Primary Examiner*—St. John Courtenay, III
(74) *Attorney, Agent, or Firm*—Staas & Halsey LLP (57) ABSTRACT

The present invention relates to a client/server system of the type wherein a server exclusively supervises data which is common to a plurality of clients. If it is detected that the server breaks down, the client temporarily retreats data, which must be transferred to the server, in a certain memory area. When it is then detected that the server is made operative again, the client automatically transfers the data, which is temporarily saved, to the server. If the client breaks down, it is detected whether or not the server is in operation and it is also checked whether or not the data which is being processed at the time of break-down or data not transferred to the server is present, after the client is made operative again. When the server is in operation and the not-yet-transferred data is left, the client automatically transfers the not-yet-transferred data to the server. In any case, the client automatically transfers data to the server and transmits a message to the server, informing that the supervising information of the data must be renewed.

15 Claims, 9 Drawing Sheets

CLIENT/SERVER SYSTEM WHICH AUTOMATICALLY ENSURES THE CORRECT AND EXCLUSIVE SUPERVISION OF DATA AGAINST FAULTS

BACKGROUND OF THE INVENTION

1. Field of the Invention

The present invention relates to a client/server system and, more particularly, a client/server system of the type in which a server supervises those data, as a unit, in the system that clients use and in which the clients receive the data from the server to manage and process them, and then return the data to the server after their managing and processing work.

2. Description of the Related Art

As the LAN (local area network) becomes more and more widely used, more and more types of client/server systems, in which data is supervised as a unit by the server, have been proposed. The client/server systems can be classified into various types, depending upon which of client's and server's programs executes the processing work of the system.

One type is intended to centrally supervise data such as files in the server's memory unit. The system of this type has a merit that all of the clients can at any time use the newest data, which has been renewed in the server's memory unit. The design aid system in which the server centrally supervises a design data base such as the CAD (computer aided design) data can be mentioned as an example of this type. In this system, the clients cause the server to transmit their required data to them, (down-loading) and they apply referring and editing processes to them and return them to the server after their processing (up-loading). The server thus re-news its supervising information of data and then the contents of the data base which it supervises, if necessary.

In this client/server system, it is necessary that those files which form the data base are exclusively controlled and their renewal history is supervised, to avoid their simultaneous renewal being made by a plurality of clients.

The above-mentioned client/server system in which the server supervises those data which clients use, centrally in his memory unit, however, has the following problems to solve when the server or client breaks down.

1) A case where the client breaks down while it is processing data received from the server:

In this case, processing data is left untransmitted in a working area of a memory unit (such as the magnetic disc storage) arranged on the client side, at the time when the client is made operative again. The server's and client's memory units, therefore, come to have same data. When the client not only reads but also writes data, the newest data is held on the client's side. In order to avoid this double-supervision of data, the user must conventionally transmit the not-yet-transferred data, which has been left untransmitted in the working area, to the server by manually inputting a command to the client through the keyboard.

2) A case where the server breaks down:

The client sometimes uses a part of its own memory unit as a save area (which is sometimes called a virtual server area), writes data which must be transmitted to the server into the save area, and stores it there until the server is made operative again. When the server is made operative again in this case, the user must conventionally transmit the data, which has been left untransmitted in the save area, to the server by manually inputting a command to the client, and store the save data in that area of the server's memory unit where the original data must be stored.

In the above-mentioned conventional measures 1) and 2), however, the user must manually transmit the data from the client to the server while checking whether or not both the server and the client are operating correctly, and whether or not the data is centrally supervised by the server. This is a burden to the user.

Consequently, in order to carry out this manual data transmission, the user must have knowledge about commands supported by the system and used for data transmission, and about the names of areas in the server's memory unit to which the data must be transmitted. In short, the user must have knowledge about the whole of the client/server system.

Knowledge is required about file transmission commands such as FTP (file transfer protocol) and rcp commands, and about the directory names for the server's transmitted files. This is a burden to the user and if circumstances demand, he must learn this knowledge from the system supervisor, or ask the supervisor to operate the system instead of him.

Further, it takes time to restore the data because data transmission is made manually.

Furthermore, the user may neglect the required data transmission. This results in the central supervision of data not being attained by the server.

SUMMARY OF THE INVENTION

The present invention relates to a client/server system in which data used by clients is supervised exclusively by a server, and the object of the present invention is to automatically hold the exclusive supervision of data is correct even when the client or server breaks down.

The present invention is therefore based on a client/server system of the type wherein the server supervises data, which is common to the clients, exclusively in its memory unit, and wherein the clients can down-load their required data from the server and return it to the server after their processing work is finished.

A first system according to the present invention is as follows:

A server supervising portion monitors whether or not the server is in operation.

A not-yet-transferred data memory portion stores not-yet-transferred data which is to be returned to the server.

A not-yet-transferred data writing portion writes the not-yet-transferred data in the memory portion.

A not-yet-transferred data confirming portion checks whether or not the not-yet-transferred data which is to be returned to the server is in the memory portion.

A not-yet-transferred data transferring portion transfers the not-yet-transferred data to the server when it is confirmed by the not-yet-transferred data confirming portion that the not-yet-transferred data is in the memory portion and when it is also confirmed by the server supervising portion that the server is in operation.

The not-yet-transferred data writing portion may write the not-yet-transferred data only in a previously-determined specific area of the not-yet-transferred data memory portion.

The not-yet-transferred data confirming portion may select data, which is to be transferred to the server, from those not-yet-transferred data which are stored in the memory portion, while comparing the renewal date of the not-yet-transferred data in the not-yet-transferred data memory portion with that of not-yet-transferred data which is supervised in the memory unit by the server.

According to the above-described first system of the present invention, the not-yet-transferred data which is to be transferred to the server is stored in the not-yet-transferred data memory portion by the not-yet-transferred data writing portion. If the client breaks down before the not-yet-transferred data is transferred to the server, the not-yet-transferred data which is not transferred to the server is left, as it is, in the not-yet-transferred data memory portion.

When the client is made operative again, it is checked by the server supervising portion whether or not the server is in operation. The not-yet-transferred data transferring portion asks the not-yet-transferred data confirming portion to confirm whether or not the not-yet-transferred data is in the not-yet-transferred data memory portion, when it is detected by the server supervising portion that the server is in operation.

When the not-yet-transferred data transferring portion is informed by the not-yet-transferred data confirming portion that the not-yet-transferred data is in the not-yet-transferred data memory portion, it reads the not-yet-transferred data out of this memory portion and transfers it to the server.

Even if the client breaks down while holding the not-yet-transferred data which is to be transferred to the server, therefore, the not-yet-transferred data can be automatically transferred from the client to the server without user input when the client is made operative again.

A second system according to the present invention is as follows:

A server supervising portion monitors whether or not the server is in operation.

A save data memory portion stores data which is generated when the server is not operative and which is to be returned to the server.

A save data writing portion writes data as save data in this memory portion when it is asked to transfer the data which is to be returned to the server and when it is detected by the server supervising portion that the server is not in operation.

A save data confirming portion confirms whether or not the save data is in this memory portion when it is detected by the server supervising portion that the server is in operation.

A save data transferring portion transfers the save data, which has been confirmed by the save data confirming portion, to the server.

The save data writing portion writes the save data only in a previously-determined specific area of the save data memory portion.

According to the above-described second system of the present invention, the break-down of the server is detected by the server supervising portion. The save data writing portion writes and retreats data, which is generated in its client unit for transferring to the server, in the save data memory portion until it is detected by the server supervising portion that the server has been made operative again.

When the server is made operative and restarts operation, this is detected by the server supervising portion. When this is detected, the save data transferring portion asks the save data confirming portion whether or not data which is saved without being transferred to the server is in the save data memory portion. When it is informed by the save data confirming portion that the save data is in this memory portion, the save data transferring portion reads the save data out of the save data memory portion and transfers it to the server.

Even if the server breaks down, therefore, data generated in the client during the break-down of the server before transferring to the server, is save and stored, without being lost, and the data thus saved is then automatically transferred from the client to the server without user input when the server is made operative again.

The client of the above-described system according to the present invention further includes a message transmitting portion for transmitting a message to ask that the supervising information of data transferred is renewed after the data is automatically transferred to the server at the time of the above-mentioned break-down. The server includes a data supervision information renewing portion for renewing the supervising information of data transferred by the client when the server receives this message.

According to the above-described client/server system of the present invention, the client can automatically transfer data to the server when the client or server is made operative again after a break-down. At the same time, the server can re-new the supervising information of the data transferred. The server can therefore supervise data, which is used by clients, correctly and exclusively in its unit.

DETAILED DESCRIPTION OF THE PREFERRED EMBODIMENTS

Principle Explanation

Figure 1:
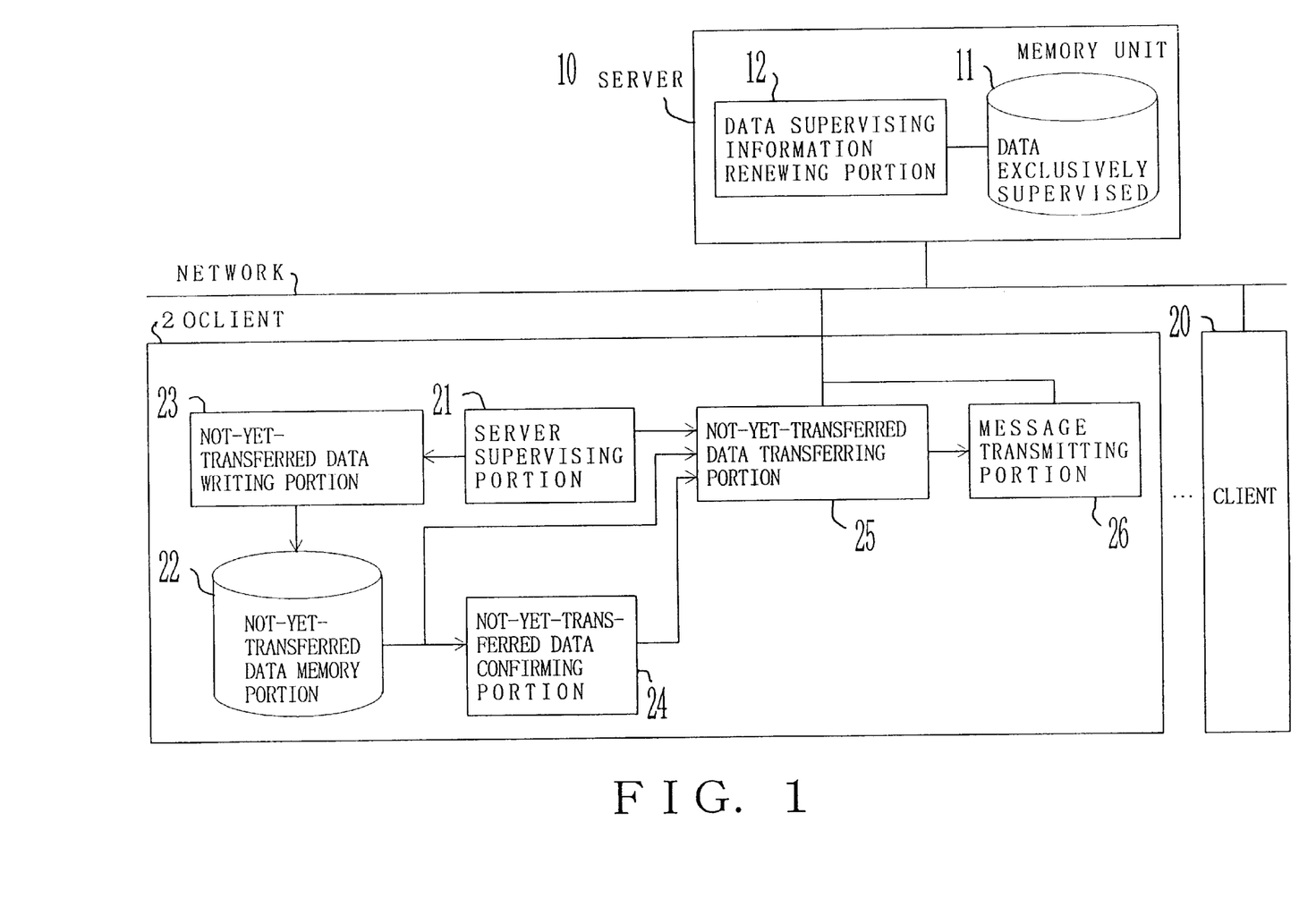
FIG. 1 is a block diagram intended to explain a first principle of the present invention.

FIG. 1 is a block diagram intended to explain a first principle of the present invention.

FIG. 1 shows a client/server system of the type wherein a server 10 supervises data, which is common to a plurality of clients 20, exclusively in its memory unit 11 and each of the clients 20 down-loads data which it requires from the server 10 and returns it to the server 10 after its processing is finished.

The client 20 includes a server supervising portion 21, a not-yet-transferred data memory portion 22, a not-yet-transferred data writing portion 23, a not-yet-transferred data confirming portion 24, a not-yet-transferred data transferring portion 25 and a message transmitting portion 26.

The server supervising portion 21 supervises whether or not the server 10 is in operation.

The not-yet-transferred data memory portion 22 stores not-yet-transferred data which is to be returned to the server 10. This data represents documents such as document files and figures contained in them.

The not-yet-transferred data writing portion 23 writes the not-yet-transferred data in the memory portion 22.

The not-yet-transferred data confirming portion 24 confirms whether or not the not-yet-transferred data which is to be transferred to the server 10 is in the memory portion 22.

The not-yet-transferred data transferring portion 25 transfers the not-yet-transferred data to the server 10 when it is confirmed by the not-yet-transferred data confirming portion 24 that the data-not-transferred is in the memory portion 22 and when it is confirmed by the server supervising portion 21 that the server 10 is in operation.

The message transmitting portion 26 transmits a message to the server 10, informing it that the supervising information of the not-yet-transferred data is to be renewed, after the not-yet-transferred data is transferred to the server 10 by the not-yet-transferred data transferring portion 25.

The server 10 includes a data supervising information renewing portion 12 for renewing the supervising information of the not-yet-transferred data, when it receives this message from the client 20.

The not-yet-transferred data writing portion 23 writes the not-yet-transferred data only in a previously-determined specific area of the not-yet-transferred data memory portion 22. This specific area is appointed by a directory name, for example.

The not-yet-transferred data confirming portion 24 selects data, which must be transferred to the server 10, from the not-yet-transferred data stored in the memory portion 22, while comparing the not-yet-transferred data in the not-yet-transferred data memory portion 22 with the renewal date information relating to the not-yet-transferred data in the memory unit 11 supervised by the server 10.

Figure 2:
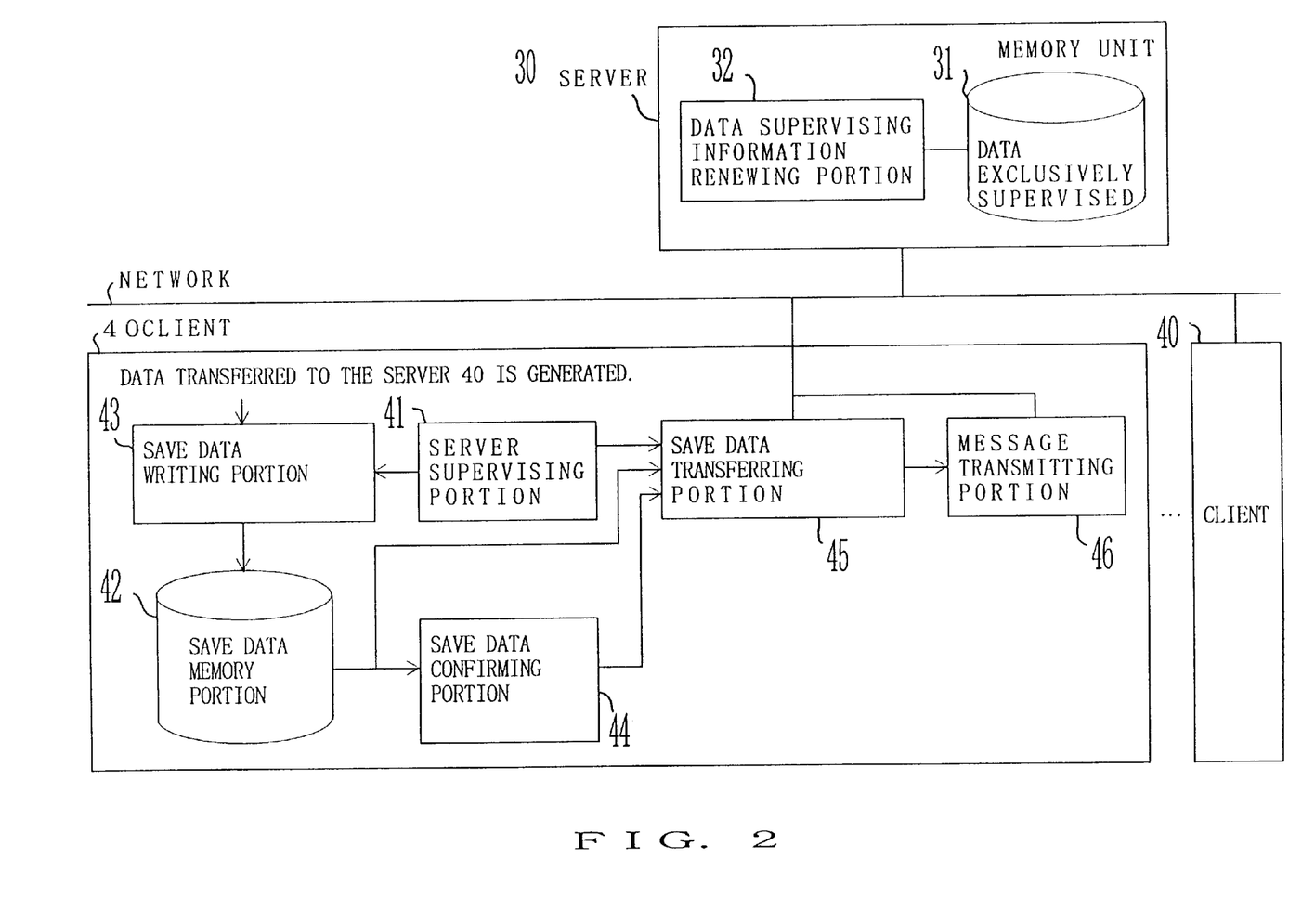
FIG. 2 is a block diagram intended to explain a second principle of the present invention.

FIG. 2 is a block diagram intended to explain a second principle of the present invention.

FIG. 2 shows a client/server system of the type wherein a server 30 supervises data, which is common to clients 40, exclusively in its memory unit 31 and each of the clients 40 down-loads data which it requires from the server 30, and returns it to the server 30 after its processing is finished.

The client 40 includes a server supervising portion 41, a save data memory portion 42, a save data writing portion 43, a save data confirming portion 44, a save data transferring portion 45 and a message transmitting portion 46.

The server supervising portion 41 monitors whether or not the server 30 is in operation.

The save data memory portion 42 stores data which is generated when the server 30 is not operative and which must be returned to the server 30.

The save data writing portion 43 writes data, as save data, in the save data memory portion 42 when it is asked that the data which must be returned to the server 30 is transferred and when it is detected that the server 30 is not operative.

The save data confirming portion 44 confirms whether or not the save data is in the save data memory portion 42 when it is detected by the server supervising portion 41 that the server 30 is in operation.

The save data transferring portion 45 transfers the save data, which has been confirmed by the save data confirming portion 44, to the server 30.

The message transmitting portion 46 transmits a message to the server 30, informing it that the supervising information of the save data is to be renewed, after the save data is transferred to the server 30 by the save data transferring portion 45.

On the other hand, the server 30 includes a data supervising information renewing portion 42 for renewing the supervising information of the save data, when it receives this message from the client 40.

The save data writing portion 43 writes the save data only in a previously-determined specific area of the save data memory portion 42. This specific area is appointed by a directory name, for example.

According to the above-described first principle, not-yet-transferred data which must be transferred to the server 10 is stored in the not-yet-transferred data memory portion 22 by the not-yet-transferred data writing portion 23. If the client 20 breaks down before the not-yet-transferred data is transferred to the server 10, the not-yet-transferred data is not transferred to the server 10 but left, unchanged, in the not-yet-transferred data memory portion 22.

When the client 20 is then made operative again, it is checked by the server supervising portion 21 whether or not the server 10 is in operation. When it is detected by the server supervising portion 21 that the server 10 is in operation, the not-yet-transferred data transferring portion 25 asks the not-yet-transferred data confirming portion 24 to confirm whether or not the not-yet-transferred data is in the not-yet-transferred data memory portion 22.

When it is informed by the not-yet-transferred data confirming portion 24 that the not-yet-transferred data is in the memory portion 22, the not-yet-transferred data transferring portion 25 reads the not-yet-transferred data out of the not-yet-transferred data memory portion 22 and transfers it to the server 10.

Even if the client 20 breaks down while holding the data which has not been transferred to the server 10, therefore, the not-yet-transferred data can be automatically transferred from the client 20 to the server 10 without user input, when the client 20 is made operative again.

After the automatic transfer of the not-yet-transferred data from the client 20 to the server 10 is carried out as described above, the client 20 transmits a message to the server 10 through the message transmitting portion 26, instructing it that the supervising information of the not-yet-transferred data is to be renewed. In response to this, the data supervising information renewing portion 32 of the server 10 renews the supervising information of the data-not-transferred in its memory unit 11.

Even if the client 20 breaks down while holding the not-yet-transferred data, therefore, the server 10 can still supervise data, which is used by clients 20, correctly and exclusively in its memory unit 11.

According to the above-described second principle of the present invention, the break-down of the server 30 is detected by the server supervising portion 41. The save data writing portion 43, therefore, writes and saves data, which is generated in its client unit and which must be transferred to the server 30, in the save data memory portion 42 until it is detected by the server supervising portion 41 that the server 30 is made operative again.

When the server 30 is thus made operative again and restarts operation, this is detected by the server supervising portion 41. When this is detected, the save data transferring portion 45 asks the save data confirming portion 44 to confirm whether or not data (or save data) which has not been transferred to the server 30 is saved in the save data memory portion 42.

When it is informed by the save data confirming portion 44 that the save data is in the memory portion 42, the save data transferring portion 45 reads the save data out of the save data memory portion 42 and transfers it to the server 30.

If the server 30 breaks down, therefore, data which is generated in the client 40 during the break-down of the server 30 and before transfer to the server 30 is saved and stored without being lost, and the data thus saved is then automatically transferred from the client 40 to the server 30 without user input when the server 30 is made operative again.

After the save data is automatically transferred as described above, the client 40 transmits a message to the server 30 through the message transmitting portion 46, informing it that the supervising information of the save data is to be renewed. When it receives this message, the server 30 renews the supervising information of the save data through the data supervising information renewing portion 32.

Even if the server 30 itself breaks down, therefore, it can still supervise data, which is used by clients 40, correctly and exclusively in its memory unit 31.

An embodiment of the present invention will be described in detail with reference to the accompanying drawings.

Figure 3:
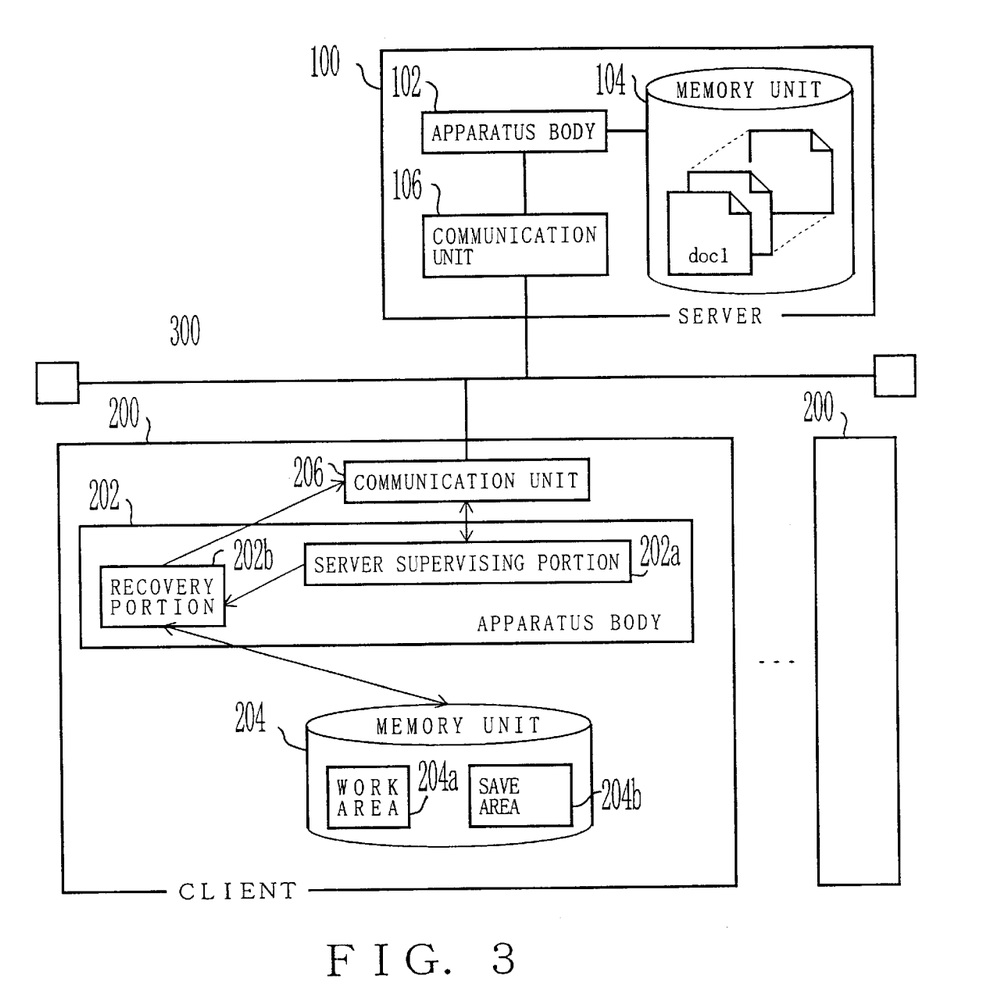
FIG. 3 is a block diagram showing the system arrangement according to an embodiment of the present invention.

FIG. 3 is a block diagram showing the client/server system according to an embodiment of the present invention.

In this embodiment of the client/server system, a server (or server machine) 100 and a plurality of clients (or client machines) 200 are connected to each other by a network 300 which comprises a LAN (local area network) of the Ethernet type, (which will hereinafter be referred to as LAN 300). The network 300 may be a LAN of another type such as token ring. It may also be a WAN (wide area network) such as a private or public network.

The server 100 includes an apparatus body 102 provided with a CPU (central processing unit), a main memory and an I/O interface, an external memory unit 104 (which will hereinafter be referred to as memory unit 104) which includes a magnetic disk and a photomagnetic disk, and a communication unit 106 which includes a LAN adapter (or network interface card) and others.

On the other hand, the client 200 includes an apparatus body 202 provided with a CPU, a main memory and an I/O interface, an external memory unit 204 (which will hereinafter be referred to as memory unit 204) having a magnetic disk and a photomagnetic disk, and a communication unit 206 having a LAN adapter (or network interface card) and others.

Although not shown, the server 100 and the client 200 are provided with external input units such as keyboard and display units such as CRT and liquid crystal displays. Further, the client 200 includes a timer 210 which will be described later. Furthermore, the main memory has an area where a transfer list 220 is formed, which will also be described later.

In the client/server system having the above-described arrangement, the server 100 and the client 200 carry out file transfer between each other through their communication units 106 and 206, according to various kinds of protocol such as TCP/IP (transmission control protocol/internet protocol), SPX/IPX and OSI (open system interconnection). The client 200 executes FTP and rcp commands upon carrying out the file transfer.

In this embodiment of the present invention, the server 100 supervises a plurality of document files "doc 1, doc 2 - - - doc n", which are common to a plurality of clients 200, exclusively in its memory unit 104.

When it becomes necessary to edit a document file "doc i" (i=1, 2, - - - n), each client 200 down-loads the required file from the server 100 and edits it. After this editing work, the document file "doc i" is returned to the server 100. The document files "doc 1, 2, - - - n" can be thus exclusively supervised by the server 100.

Each client 200 has work and save areas 204a and 204b respectively in its own memory unit 204. The work area 204a is used to temporarily store data of the document file "doc i" which is being edited. On the other hand, the save area 204b is used to save and store the document file "doc i" after it is edited, until the server 100 is made operative again, if it breaks down while the down-loaded document file "doc i" is being edited.

The apparatus body 202 of the client 200 includes a server supervising portion 202a and a recovery portion 202b. Both portions 202a and 202b can be realized when the CPU in the apparatus body 202 executes programs loaded in its main memory to realize their functions. They may also be realized by their own processors.

The communication units 106 and 206 incorporated into the server 100 and the client 200, respectively, control and execute the transmitting and receiving of data, such as document files "doc i" and messages between the server 100 and the client 200, through the LAN 300. They are of the processor type or of the non-processor type which is usually called a non-intelligent board. Further, they carry out data transfer between their apparatus bodies 102 and 202 through the I/O control, common memory or bus master system, for example.

The I/O control system is intended to transmit and receive data in response to I/O commands applied from the CPUs in the apparatus bodies 102 and 202. The common memory system is intended to transmit and receive data through the common memory. At the data transmitting time, the CPUs write transmitted data directly in the memories in the communication units 106 and 206. At the data receiving time, the communication units 106 and 206 write received data in the common memory arranged in a memory space of the CPU, for example.

The bus master system is intended to transmit and receive data in such a way that the communication units 106 and 206 serve as bus masters to read and write data out of and into memories in the apparatus bodies 102 and 202.

Figure 4:
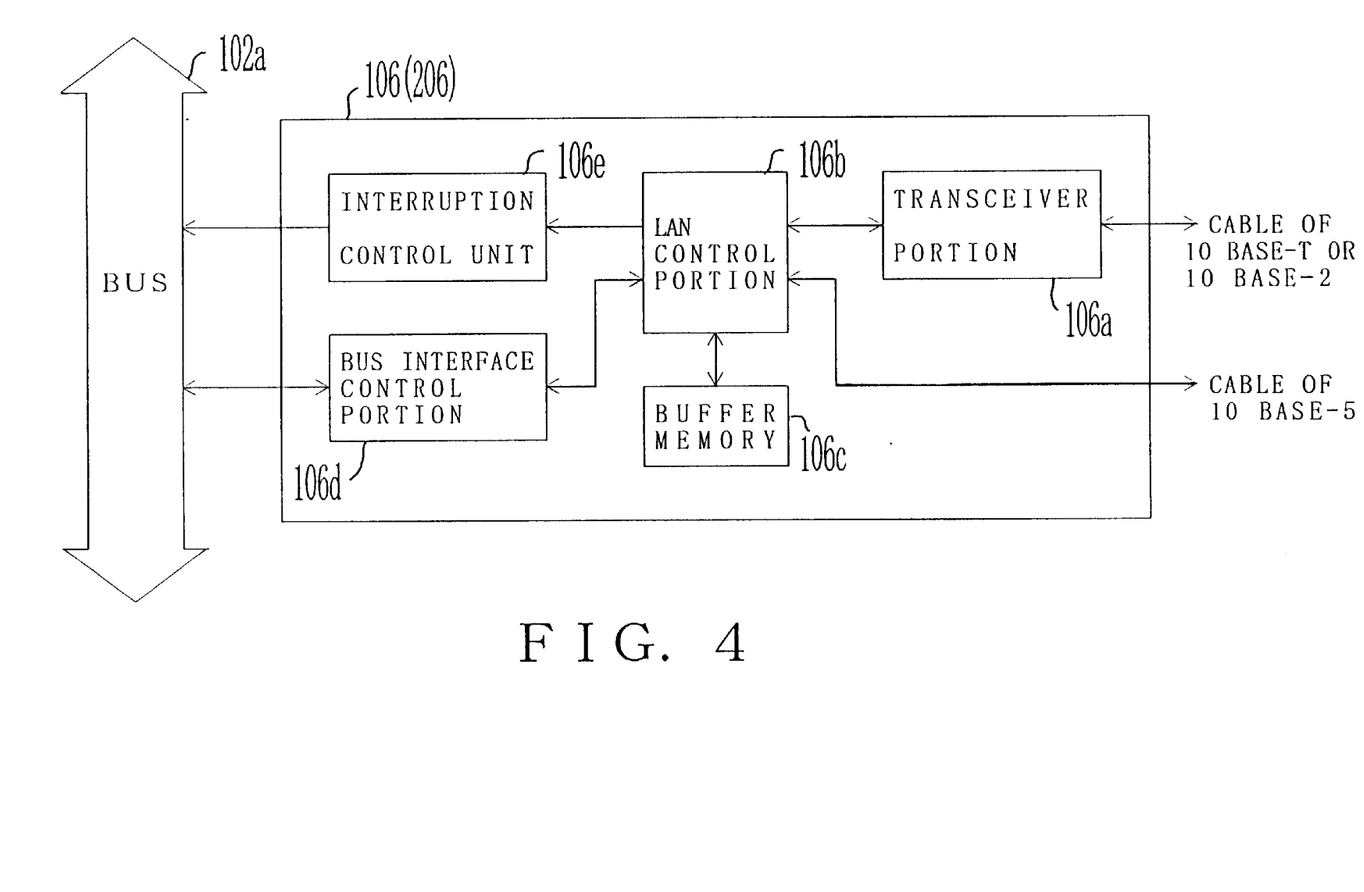
FIG. 4 is a block diagram showing the internal circuit arrangement of a communication unit.

FIG. 4 is a block diagram showing a circuit arrangement in the communication unit 106 or 206 of the non-processor type of I/O control system.

In FIG. 4, a transceiver portion 106a is connected to the LAN 300 by a cable (or transceiver cable) for 10 BASE-T or 10 BASE-2. It performs the same function as the physical layer of an OSI (open system interconnection) reference model. In short, it converts transmitting data into electrical signals to match the transceiver cable for the 10 BASE-T or 10 BASE-2, and transmits them to this cable. It also receives input data as electrical signals through the cable, converts them into digital data which can be processed by a LAN control portion 106b, and then transmits them to the LAN control portion 106b.

The LAN control portion 106b monitors the state of the LAN 300 through the transceiver portion 106a, and it reads data out of a buffer memory 106c and sends it to the LAN 300 through the transceiver portion 106a when the transmitting of data becomes possible.

The buffer memory 106c serves as a memory to store therein data transmitted and received. The LAN control portion 106b receives transmitted data by receiving I/O commands applied from the CPUs in the apparatus bodies 102 and 202 through a bus interface control portion 106d, which will be described later. It then writes data thus received in the buffer memory 106c. Further, it writes data, which is received through the transceiver portion 106a, in the buffer memory 106c and temporarily stores it there.

The bus interface control portion 106d is an interface circuit for controlling the apparatus bodies 106, 206 and the LAN control portion 106b to correctly transmit and receive I/O commands and data and it is connected to a bus (or system bus) 102a of the apparatus bodies 102 and 202.

An interruption control portion 106e is connected to CPUs in the apparatus bodies 102 and 202 through the bus 102a and, in response to commands applied from the LAN control portion 106b, it interrupts the CPUs to inform them of the various states of the apparatus bodies 102 and 202.

When the communication units 106 and 206 are connected to each other through the LAN 300 and the cable for 10 BASE-5, the LAN control portion 106 is connected directly to the transceiver, which is attached to the main line (or coaxial cable) of the LAN 300, through the transceiver cable.

It will be described how the above-described embodiment is operated.

Figure 5:
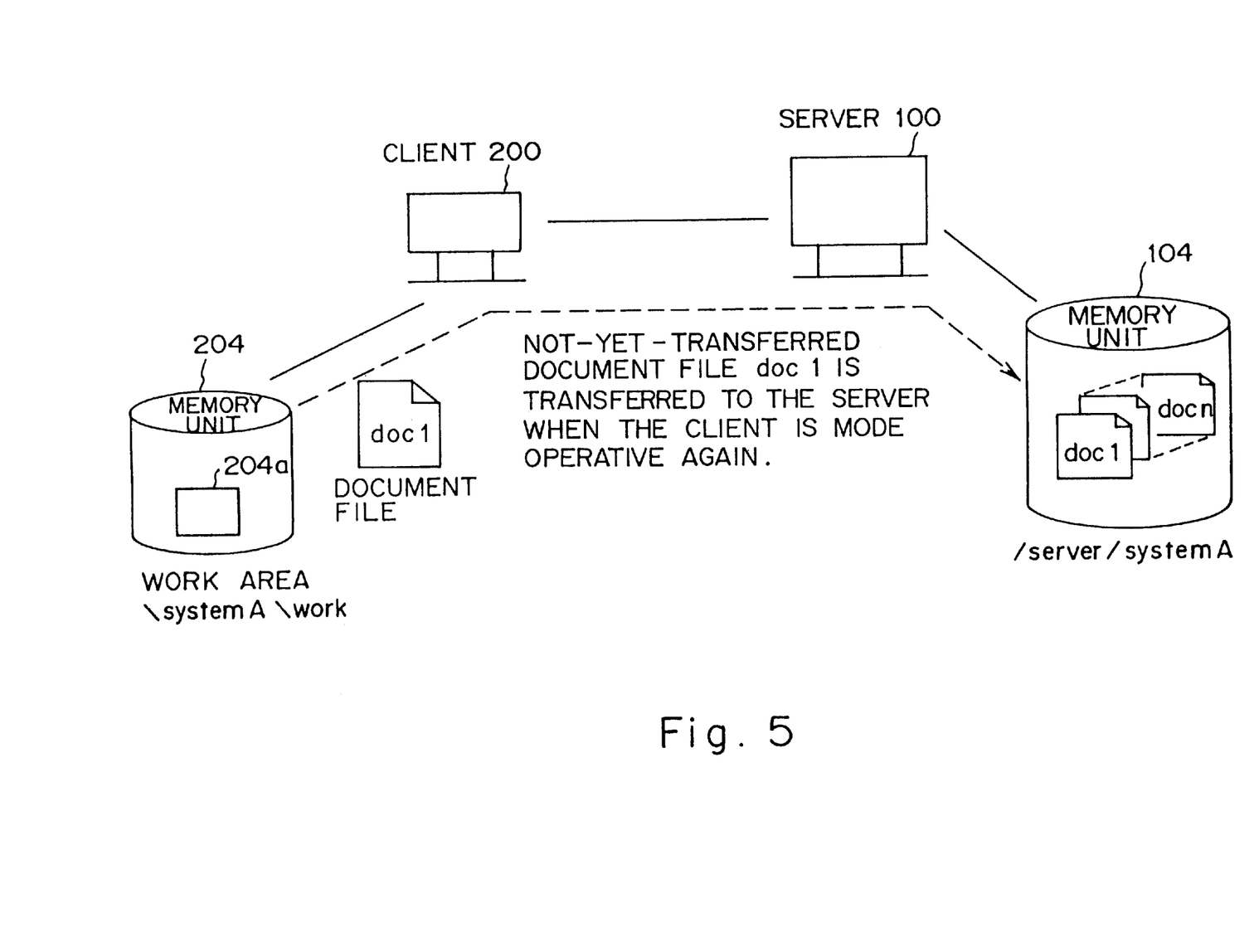
FIG. 5 is intended to explain how a not-yet-transferred file is automatically transferred when the client breaks down.
Figure 6A:
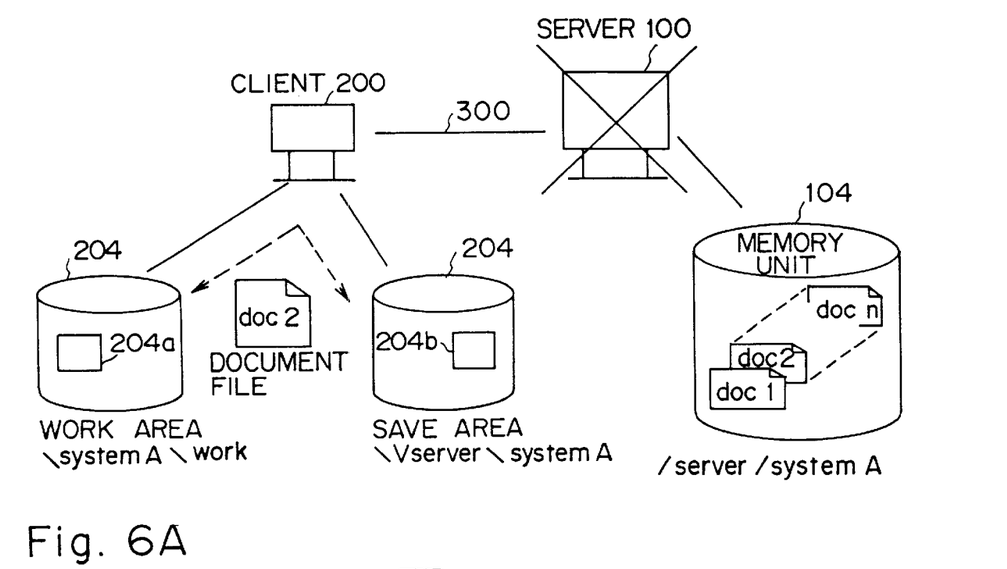
FIGS. 6A, 6B are intended to explain how the client operates when a document file which is to be transferred to the server is generated during the break-down of the server.
Figure 6B:
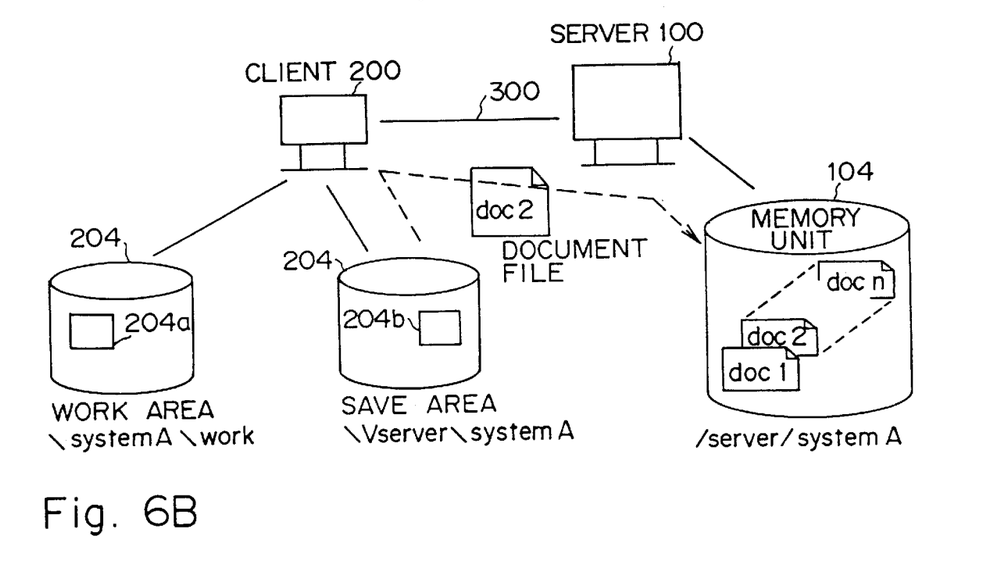

Referring to FIGS. 5 and 6, it will be described how the server 100 recovers again its exclusive supervision of document files "doc 1, 2, - - - n" if both the server 100 and the client 200 break down.

The server 100 supervises a plurality of document files "doc 1, 2, - - - n" under a directory "/server/system A" prepared in the memory unit 104. On the other hand, the client 200 realizes the work area 204a, in which document files down-loaded from the server 100 are stored, to be a directory "\ system A \ work" for not-yet-transferred document files, which is prepared in the memory unit 204. The save area (or virtual server area) 204b which is used as a virtual server when the server 100 breaks down and which is also used to save data transmitted to the server 100 is realized to be a directory "\ V server \ system A" prepared in the same memory unit 204.

FIG. 5 is intended to explain how the system is operated when the client 200 breaks down.

1) The client 200 receives a document file "doc 1" from the server 100 through the LAN 300 and stores it in the work area 204a, or under the directory "\ system A \ work".

2) The client 200 breaks down while editing the down-loaded document file "doc 1" in the work area 204a.

3) The client 200 is made operative again after it breaks down. It checks this time whether or not any document file is present under the directory "\ system A \ work", and confirms that the document file "doc 1" is present under it. It thus finds that the document file "doc 1" has not been transferred to the server 100, and it transfers it to the server 100 through the LAN 300. This document transfer is automatically carried out, as will be later described in more detail, by the client 200. The client 200 sends a message to the server 100, instructing it that the supervising information of document files must be renewed. In response to this message, the server 100 renews the supervising information that the client which sent the message now has the document file "doc 1".

It may be arranged in this case that the renewal date of the document file "doc 1" under the directory "/server/system A" is requested by the server 100, that this date is compared with that of the not-yet-transferred document file "doc 1", and that only when the renewal date of the not-yet-transferred document file "doc 1" is newer, this document file "doc 1" is regarded as having to be transferred, and is transferred to the server 100.

FIG. 6A and FIG. 6B are intended to explain how the system is operated when the server 100 breaks down.

1) Similarly to the above, the client 200 down-loads a document file "doc 2" from the server 100 into the work area 204a, or under a directory "\ system \ work" and edits it in the work area file 204a (FIG. 6A).

2) The server 100 breaks down while the client 200 is editing the document file "doc 2". When the editing of the document file "doc 2" is finished, the client 200 checks through the server supervising portion 202a whether or not the server 100 is in correct operation, and it detects that the server 100 has broken down. Instead of transferring the document file "doc 2", whose editing is finished in the work area 204a, to the server 100, therefore, the client 200 transfers and saves it, as a save file "doc j" (j=1, 2, - - - n), to the save area 204b, or under the directory "\ system \ system A" in its memory unit 204. When it is then detected through the server supervising portion 202a that the server has been made operative again, the document file "doc 2" which has been saved to the save area 204b is automatically transferred to be under the directory "/server/system A" of the server 100 (FIG. 6B).

Figure 8:
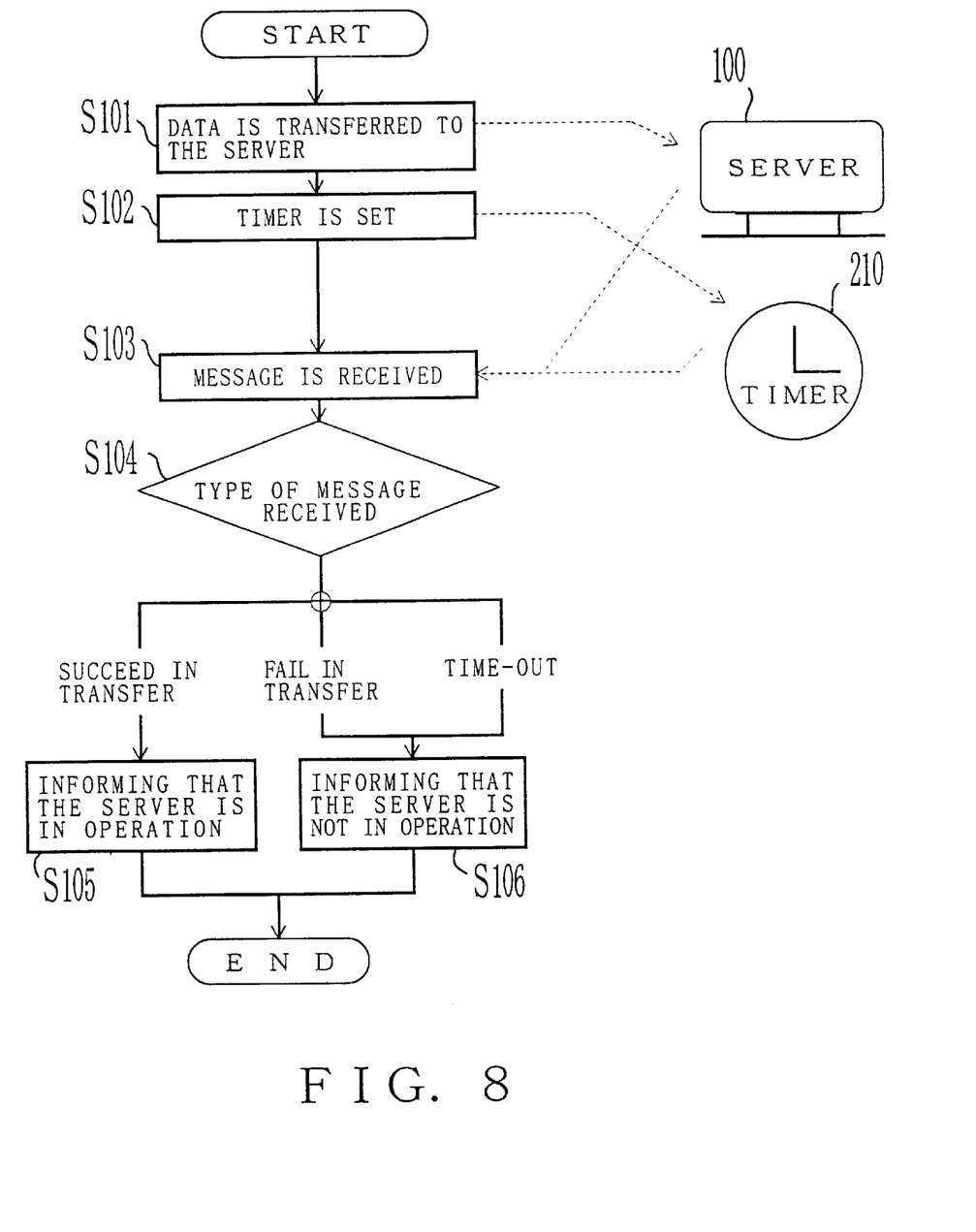
FIG. 8 is a flow chart showing the server supervising process conducted by the client.
Figure 9:
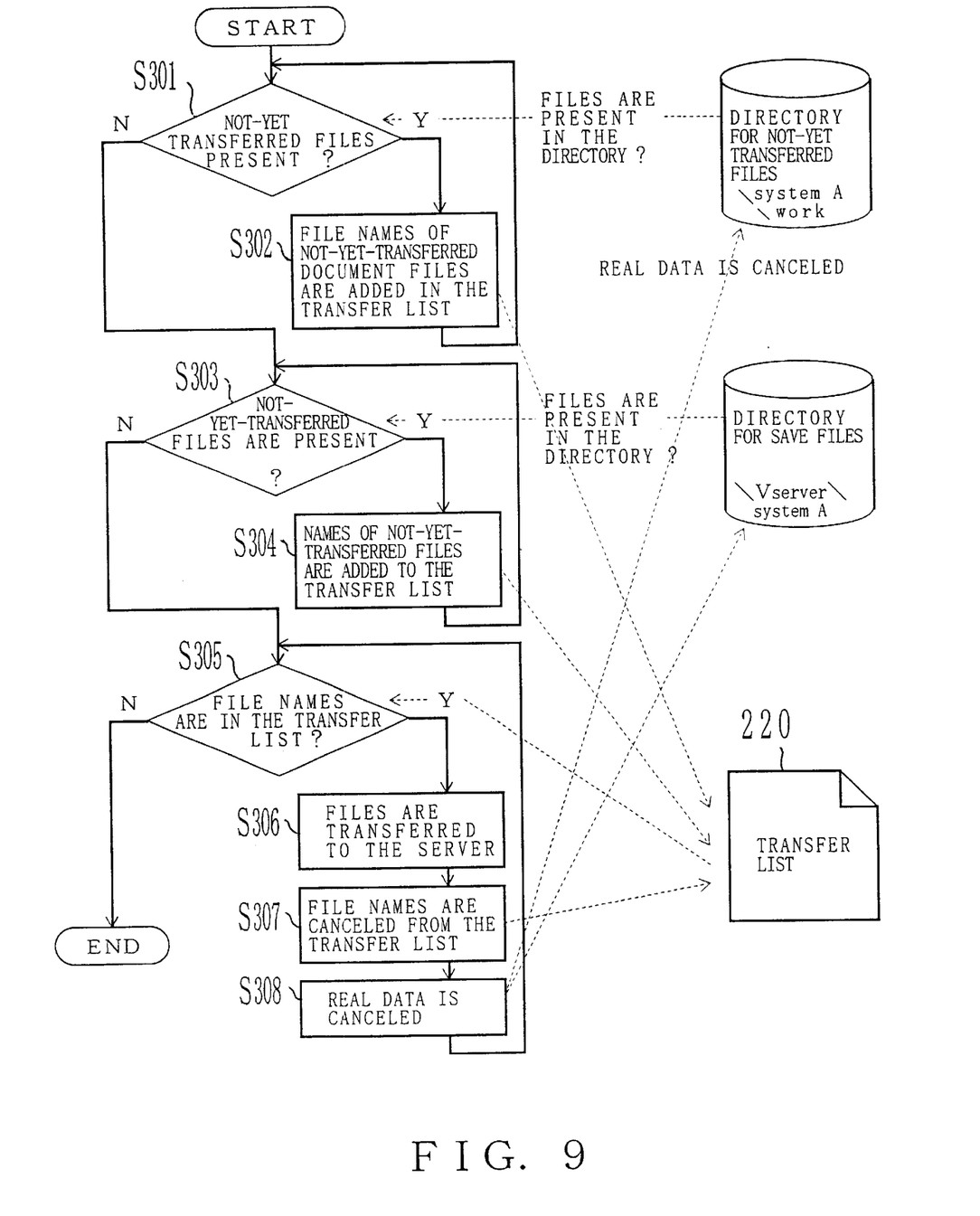
FIG. 9 is a flow chart showing a file recovery process conducted by the client.

Referring to flow charts shown in FIGS. 7 through 9, it will be described how the client 200 operates to return the server's exclusive supervision of document files "doc 1, 2, - - - n" to the correct state, when the client 200 or server 100 is made operative again after it breaks down.

Figure 7:
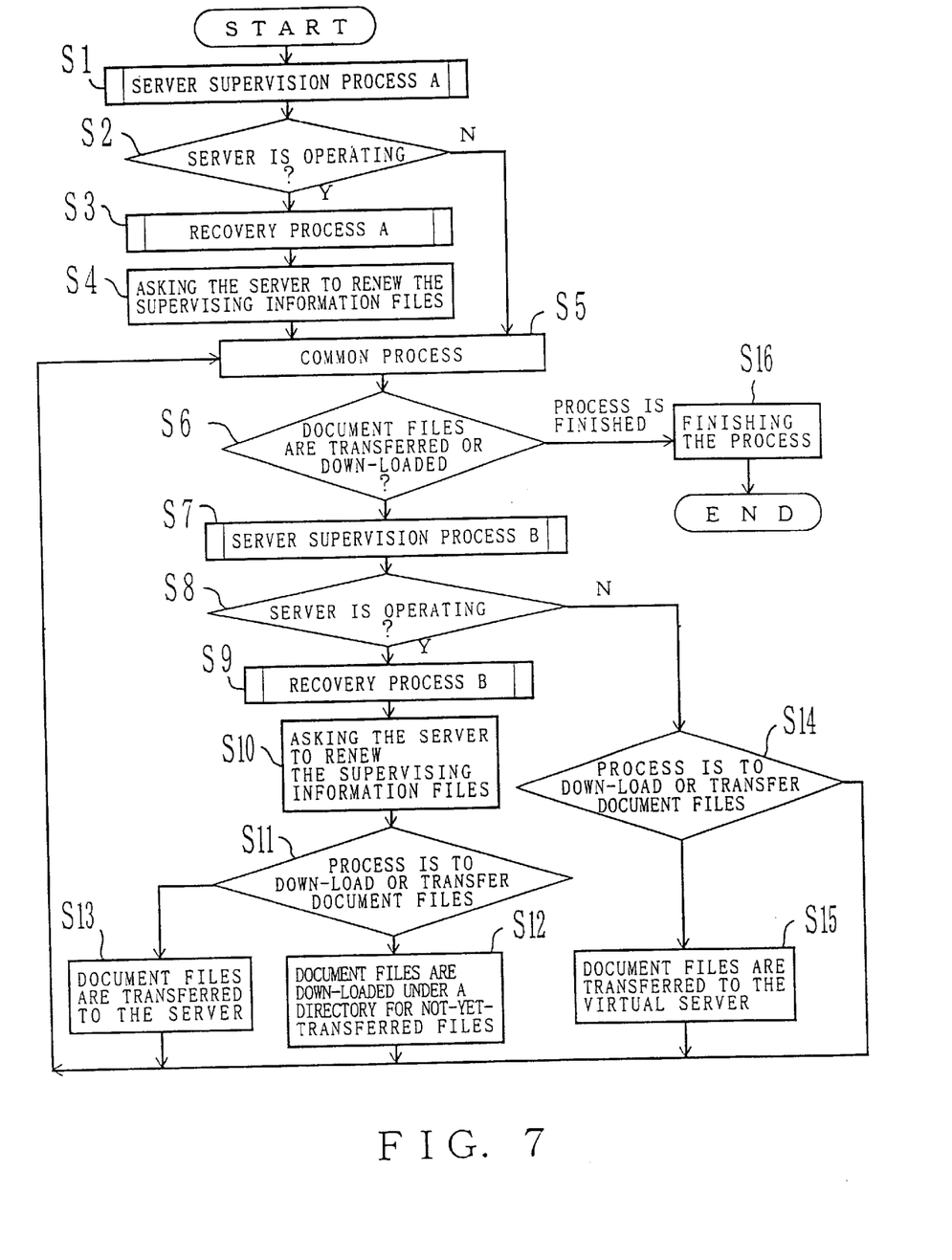
FIG. 7 is a flow chart showing the whole operation of the client.

FIG. 7 is a general flow chart showing the whole operation of the client 200.

When the system is started, the client 200 makes the server supervising portion 202a operative and asks it whether or not the server 100 is in operation. In response to this enquiry, the server supervising portion 202a checks the state of the server 100 by using communication between processes through the LAN 300, and it informs a control portion (not shown) of the client 200 whether or not the server 100 is in operation (step S1).

When so informed, it is confirmed whether or not the server 100 is in operation (step S2) and when the server 100 is in operation (S2, YES), the recovery portion 202b is made operative and a recovery process A is carried out in such a way that a not-yet-transferred document file "doc i" stored in the work area 204a, or a document file "doc j" saved in the save area 204b (because the server 100 broke down when it was about to be transferred), is transferred to the server 100 through the LAN 300 (step S3).

The document file "doc i" which was not transferred because the client 200 broke down (or not-yet-transferred document file "doc i") is thus automatically transferred to the server 100. If the client 200 also breaks down while the server 100 is still broken down, and when the server 100 is made operative again faster, for example, the document file "doc j" saved in the save area 204b (or document file doc j saved) is also automatically transferred to the server 100.

The client 200 then sends a certain predetermined message to the server 100 through the LAN 300 to renew the supervising information of the document files "doc i" and "doc j" which have been transferred to the server 100 (step S4).

A common process is then executed to meet requests made by the users (step S5). When it is found at step S2 that the server 100 is not in operation (S2, NO), the process advances at once to this common process at step S5.

The common process is generally divided into the following three processes:

1) A referring or editing process requested by the user is carried out relating to the data of the document file "doc i" down-loaded from the server 100, and after this processing, the data is reflected in the document file "doc 1" under the directory "\ system A \ work", for not-yet-transferred document files, or in the work area 204*a*. After the editing process is finished, a closing process is carried out relating to the document file "doc i", and renewal date information (such as year, month, day and time) is set relative to it.

2) A document file "doc i" requested by the user is down-loaded from the server 100 into the work area 204*a* through the LAN 300, or following a request from the user, the document file "doc i" in the work area 204*a* whose editing is finished, is up-loaded to the server 100.

3) An instruction that the operation of the client 200 is finished.

It is checked at step S6 which of these processes 1)–3) is requested by the user.

When it is found at step S6 that transmitting and receiving of data (such as document file "doc i" and message) is requested relative to the server 100, as shown in the above 1) or 2), the server supervising portion 202*a* is made operative as seen at step S1 (step S7).

When it is confirmed through the server supervising portion 202*a* that the server 100 is in operation (S8, YES), the recovery portion 202*b* is then made operative to carry out a recovery process B in such a way that the saved or not-yet-transferred document file "doc j" or "doc i", which is present in the save or work area 204*b* or 204*a*, is transferred to the server 100 (step S9).

The document file "doc j" which was not transferred to the server 100 but saved to the save area 204*b* when the server 100 broke down, is thus automatically transferred to the server 100. The document file "doc i" which was not transferred because the server 100 was not in operation at step S2, is also automatically transferred to the server 100.

A message is then transmitted, instructing that the supervising information of the document files "doc i" and "doc j", which have been transferred to the server 100, is to be renewed (step S10).

The server 100, therefore, renews the supervising information of the document files "doc i" and "doc j".

It is then confirmed that the process requested by the user is either to down-load the document file "doc i" from the server 100, or to return the document file "doc j" whose editing or referring is finished to the server 100 (step S11).

When it is to down-load the document file "doc i", the document file "doc i" is down-loaded from the server 100 to be under the directory "\ system A \ work", prepared in the memory unit 204 of the client 200 (step S12), and the process is returned to step S5.

The document file "doc i" requested and appointed by the user is thus down-loaded from the server 100 to the work area 204*a* or under the directory "\ system A \ work" for not-yet-transferred files.

When it is found at step S11 that the process requested by the user is to transfer the document file "doc i", whose editing is finished and which is in the work area 204*a* or under the directory "\ system A \ work", to the server 100, the document file "doc i" is transferred to the server 100 through the LAN 300 and it is then released or canceled from the work area 204*a* or from under the directory "\ system A \ work", (step S13). The process is then returned to step S5.

The document file "doc i" which is supervised exclusively by the server 100 is thus returned to be under the directory "/server/system A" prepared in the memory unit 104 of the server 100, which renews the contents of the document file "doc i" and its supervising information. Further, the document file "doc i" which has been returned to the server 100 is canceled from the work area 204*a* or from under the directory "\ system A \ work" for not-yet-transferred document files.

When it is found at step S8 that the server 100 is not in operation, the process requested by the user is confirmed as seen in step S11 (step S14).

When the process requested by the user is to transfer the document file "doc j" (j=1, 2, - - - n), which is under the directory "\ system A \ work" for not-yet-transferred document files, to the server 100, the document file "doc j" is transferred not to under the document file supervising directory "/server/system A", but to under a save document file directory "\ V server \ system A" which is prepared in the memory unit 204 of the client 200, and which is regarded as the virtual server 100, and the document file "doc j" is then canceled from under the directory "\ system A \ work" for not-yet-transferred document files (step S15).

The process is then returned to step S5.

If the server 100 breaks down when the document file "doc j" is transferred to the server 100, the document file "doc j" is thus transferred from under the directory "\ system A \ work" for not-yet-transferred document files to under the directory "\ V server \ system A" for save document files, and it is stored in the save area 204*b* or under the directory "\ V server \ system A".

When the process requested at step S14 by the user is to receive data to down-load the document file "doc i", the process is returned at once to step S5. In addition to the above-mentioned processes 1)–3), the common process at step S5 includes various kinds of processes which can be executed, independently of others, in the client 200 without gaining any access to the server 100. The operation of the server is supervised at all times when one of these independent processes is being executed, and in a case where not-yet-transferred or save data is present when it is found that the server is in operation, the above-described recovery process B may be carried out or a renewal command may be sent.

When it is found at step S6 that the process requested by the user is to finish the operation of the client 200, a predetermined finish process is carried out (S15) to finish the operation of the client 200.

The server supervising processes A and B cited at steps S1 and S7 in FIG. 7 will be described, referring to a flow chart in FIG. 8. They are executed by the server supervising portion 202*a*.

When made operative by the control portion, the server supervising portion 202*a* transfers predetermined data (or a message) to the server 100 through the communication unit 206. This data requests the server 100 to respond to it (step S101).

A certain timer value is then set in a timer 210 housed in the apparatus body 202. A message from the server 100, responding to the data transferred, is awaited (step S102). A message "time-out" is sometimes received from the timer 210 under this waiting state.

When the message is received under this waiting state (step S103), the type of the message received is confirmed (step S104).

When the message is received from the communication unit 106 of the server 100, informing that the data is successfully transferred, it is found that the server 100 is in operation and the control portion is informed of this (step S105).

When the message is received from the communication unit 106 of the server 100 or from the timer 210, informing that the message transfer is not successful or that time-out occurs, it is found that the server 100 is not in operation and the control portion is informed of this (step S107).

The recovery processes A and B cited at steps S3 and S9 in FIG. 7 and executed by the recovery portion 202b will be described in detail, referring to a flow chart in FIG. 9.

When made operative by the control portion, the recovery portion 206 checks whether or not any not-yet-transferred document file "doc i" is present under the directory "\ system A \ work" for not-yet-transferred document files (step S301).

When the not-yet-transferred document file "doc i" is present (S301, YES), the file name of the document file "doc i" is added to the transfer list 220 prepared in a main memory of the apparatus body 202 (step S302).

The process including the steps S301–S302 is repeated for all of the document files "doc i" which are under the directory "\ system A \ work" for not-yet-transferred document files. File names of all document files "doc i" not transferred are registered in the transfer list 220.

It is then checked whether or not the document file "doc j" saved because the server 100 breaks down is present under the directory "\ V server \ system A" (step S303), and when the document file "doc j" is present (S303, YES), its file name is added to the transfer list 220 (step S304).

The process including the steps S303–S304 is repeated until all of save document files "doc j" which are under the save document file directory "\ V server \ system A" are detected. File names of all save document files "doc j" are thus registered in the transfer list 220.

When the process including the steps S301–S304 is finished, the transfer list is checked to find whether or not file names are registered in the transfer list (step S305).

All of the not-yet-transferred document files "doc i" or those document files "doc j" saved, whose file names have been registered in the transfer list 220, are transferred to the server 100 through the communication unit 206 (step S306).

After the document files "doc i" and "doc j" are transferred in this manner, their file names are canceled from the transfer list 220 (step S307) and their real data are deleted or canceled from the directories "\ system A \ work" and "\ V server \ system A" (step S308).

The process including the steps S305–S308 is repeated for all of the document files "doc i" and "doc j" which have been registered in the transfer list 220. All of the document files "doc i" and "doc j" which are under the directories "\ system A \ work" and "\ V server \ system A" and which must be transferred to the server 100 can be thus transferred to the server 100.

The transfer of not-yet-transferred document files "doc i" and those "doc j" saved from the client 200 to the server 100 through the LAN 300, can be attained when FTP command which uses an FTP (file transfer protocol) for the ARPANET (advanced research project agency network), or an rcp command under which UNIX systems copy files between them through a network is automatically executed by the apparatus body 202 of the client 200, without user input.

It may be arranged that the client 200 supervises the operation of the server 100 at certain time intervals to execute the recovery process B at any time, including those times when it is made operative or when a request to transmit and receive data about document files doc i is made to the server 100.

Further, the recovery process B may be executed after the lapse of a certain time period since save document files "doc j" are caused. This can prevent save document files "doc j "from being left not transferred to the server 100 for a long time. This certain time period is counted by the timer 210.

Although it is document files "doc 1, 2, - - - n" that have been supervised exclusively by the server 100 in the above-described case, these files may be sounds, images and others. Further, the automatic transfer of not-yet-transferred or save data to the server may be made not by commands but by other methods.

According to the above-described present invention, data which are present on the client side when the server or client breaks down, and which must be transferred to the server, can be automatically transferred to the server without user input at the time when the server or client is made operative again.

Further, the exclusive supervision of data by the server can be thus made easier and more reliable and accordingly, the protection of data can be made more reliable.

Furthermore, the exclusive supervision of data can be achieved with a higher reliability by the server even when the user operating the client has no knowledge about the whole of the system.

What is claimed is:

1. A client/server system comprising:
   a server which supervises data;
   a plurality of clients for which the server supervises data in a memory unit in the server, each client down-loads data, which is required for a data processing in each client, from the server and returns the data to the server after the data processing is finished, each of said clients comprising:
   a data receiving process downloading the data from the server:
   a server supervisor that determines whether the server is in correct operation or is down by sending data to the server without receiving an inquiry from said server;
   a not-yet-transferred data memory for storing, during operation as a client and when the server supervisor determines that the server is not in operation, not-yet-transferred data to be returned to the server when the server returns to operation;
   a not-yet-transferred data writing process, during operation as a client, writing the not-yet-transferred data to the not-yet-transferred data memory when the server supervisor determine that the server is not in operation;
   a not-yet-transferred data confirming process, during operation as a client, checking whether the not-yet-transferred data to be transferred to the server is present in the not-yet-transferred data memory; and
   a not-yet-transferred data transferring process, during operation as a client, transferring the not-yet-transferred data to the server, when the not-yet-transferred data confirming process confirms that the not-yet-transferred data is present in the not-yet-transferred data memory and the server supervisor confirms that the server is in operation.

2. The client/server system according to claim 1, wherein said not-yet-transferred data writing process writes the not-yet-transferred data in a predetermined specific area of said not-yet-transferred data memory.

3. The client/server system according to claim 1, wherein said not-yet-transferred data confirming process compares the not-yet-transferred data in said not-yet-transferred data memory with the renewal date information of the not-yet-transferred data supervised in the server to select from the not-yet-transferred data stored in said not-yet-transferred data memory, that data which is to be transferred to the server.

4. The client/server system according to claim 1, wherein each of said plurality of clients further comprise:
- a message transmitter transmitting a message to the server, informing that information regarding supervising the not-yet-transferred data is to be renewed, after the not-yet-transferred data is transferred to the server by the not-yet-transferred data transferring process; and
- wherein the server has a corresponding data supervising information renewing process for renewing the information regarding supervising the not-yet-transferred data when the server receives the message from the client.

5. A client/server system comprising:
- a server which supervises data; and
- a plurality of clients, each client down-loads data, required for a data processing in each client, from the server and returns the data to the server after the data process is finished, each of said clients comprising:
  - a data receiving process downloading the data from the server;
  - server supervising means for determining whether the server is in correct operation or is down by sending data to the server without receiving an inquiry from said server;
  - save data memory storing data;
  - save data writing means for writing the data, as save data, in the save data memory when the server supervising means detects that the server is not in operation;
  - save data confirming means for confirming whether the save data is present in the save data memory when the server supervising means detects that the server is in operation; and
  - save data transferring means for transferring the save data, confirmed by the save data confirming means, to the server.

6. The client/server system according to claim 5, wherein said save data writing means writes the save data in a predetermined area of said save data memory.

7. The client/server system, according to claim 5, wherein each of said Plurality of clients further comprising:
- message transmitting means for transmitting a message to the server, informing that information regarding supervising the save data is to be renewed, after the save data is transferred to the server by the save data transferring means; and
- wherein the server is Provided with data supervising information renewing means for renewing the information regarding supervising the save data when it receives the message from the client.

8. A client for down-loading data, from a server and returning the data, to the server after the data processing is finished, the client comprising:
- data receiving means for downloading the data from the server;
- not-yet-transferred data memory means for storing not-yet-transferred data to be returned to the sever, when the server is not in correct operation or down by sending data to the server without receiving an inquiry from said server;
- not-yet-transferred data writing means for writing the not-yet-transferred data to the not-yet-transferred data memory means;
- not-yet-transferred data confirming means for confirming whether the not-yet-transferred data to be transferred to the server is present in the not-yet-transferred data memory means; and
- not-yet-transferred data transferring means for transferring the not-yet-transferred data to the server, when the not-yet-transferred data confirming means confirms the not-yet-transferred data is present in the not-yet-transferred data memory means and the server supervising means confirms that the server is in operation.

9. The client apparatus according to claim 8, further comprising:
- message transmitting means for transmitting a message to the server, informing that information regarding supervising the not-yet-transferred data is transferred to the server by the not-yet-transferred data transferring means.

10. A client for down-loading data, required for data processing, from a sever and returning the data to the server after the data processing is finished, the client comprising:
- data receiving means for downloading the data from the server;
- server supervising means for supervising whether the server is in correct operation or is down by sending data to the server without receiving an inquiry from the server;
- save data storing means for saving and storing data when the server is not in operation which is to be returned to the server when the server returns to operation;
- data saving means for storing the data, which is to be returned to the server, in the save data storing means when the server supervising means confirms that the server is not in operation; and
- save data returning mean for returning the save data, which is stored in the data save means, to the server when the server supervising means confirms that the server is in operation.

11. The client apparatus according to claim 10, further comprising:
- message transmitting means for transmitting a message to the server, informing that information regarding supervising the save data is to be renewed, when the save data is returned to the server by the save data returning means.

12. A data supervising method for a client/server system, wherein a server supervises data, common to plural clients, in a memory unit in the server, the method comprising the steps of:
- downloading the data from the server to the client;
- processing the data in the client; and
- if the client breaks down after the data processing is finished, but before the data is transferred to the server:
  - (a) making the client operative again;
  - (b) detecting whether not-yet-transferred data waiting for transfer to the server is present;
  - (c) detecting, in the client, whether the server is in correct operation or the server is down by sending data to the server without receiving an inquiry from said server;

(d) transferring the not-yet-transferred data to the server by detecting that the not-yet-transferred data is present and that the server is in operation; and (e) storing the not-yet-transferred data, which is transferred from the client, in the memory unit in the server.

13. The data supervising method according to claim 12, further comprising the step of:

transmitting a message from the client to the server, informing that information regarding supervising the not-yet-transferred data is to be renewed, when the not-yet-transferred data is transferred to the server; and renewing the information regarding supervising the not-yet-transferred data in the server, responsive to the message.

14. A data supervising method for a client/server system wherein a server supervises data common to a plurality of clients in a memory unit of the server, the method comprising the step of:

downloading, from the server, required data from the data in the server;

processing the data downloaded in the client;

detecting, in the client, whether the server is in correct operation or is down by sending data to the server without receiving an inquiry from said server;

temporarily storing the processed data, which is to be returned to the server, in a predetermined memory area when the server is not in operation;

transferring the temporarily save data to the server when the server is detected, in the client, to be once again correctly operative by sending the data to the server without receiving an inquiry from said server; and storing the processed data which is transferred from the client in the memory unit of the server.

15. The data supervising method according to claim 14, further comprising the step of:

transmitting a message from the client to the server, informing that information regarding supervising the not-yet-transferred data is to be renewed, when the not-yet-transferred data is transferred to the server; and renewing the information regarding supervising the not-yet-transferred data in the server responsive to the message.

\* \* \* \* \*